(12) United States Patent
Bui

(10) Patent No.: US 7,736,431 B2
(45) Date of Patent: Jun. 15, 2010

(54) LIGHTWEIGHT STRUCTURAL CONCRETE PROVIDED WITH VARIOUS WOOD PROPERTIES

(76) Inventor: Thuan H. Bui, 58 N. Mascher St., Philadelphia, PA (US) 19106

( * ) Notice: Subject to any disclaimer, the term of this patent is extended or adjusted under 35 U.S.C. 154(b) by 702 days.

(21) Appl. No.: 11/607,885

(22) Filed: Dec. 4, 2006

(65) Prior Publication Data

US 2007/0125275 A1    Jun. 7, 2007

Related U.S. Application Data

(60) Provisional application No. 60/741,487, filed on Dec. 2, 2005, provisional application No. 60/786,729, filed on Mar. 29, 2006.

(51) Int. Cl.
C04B 7/02 (2006.01)
C04B 14/18 (2006.01)

(52) U.S. Cl. ........... 106/713; 106/644; 106/705; 106/737; 106/DIG. 1; 106/DIG. 2

(58) Field of Classification Search ......... 106/713, 106/644, 705, 737, DIG. 1, DIG. 2
See application file for complete search history.

(56) References Cited

U.S. PATENT DOCUMENTS

| | | | | |
|---|---|---|---|---|
| 4,293,341 | A * | 10/1981 | Dudley et al. | 106/675 |
| 4,900,359 | A | 2/1990 | Gelbman | |
| 5,080,022 | A | 1/1992 | Carlson | |
| 5,183,505 | A | 2/1993 | Spinney | |
| 5,725,652 | A | 3/1998 | Shulman | |
| 5,759,260 | A * | 6/1998 | Groh | 106/672 |
| 6,402,830 | B1 * | 6/2002 | Schaffer | 106/675 |
| 6,488,762 | B1 * | 12/2002 | Shi | 106/676 |
| 6,528,547 | B2 | 3/2003 | Shulman | |
| 6,572,697 | B2 * | 6/2003 | Gleeson et al. | 106/705 |
| 6,881,257 | B2 | 4/2005 | Beauboeuf | |
| 2006/0225618 | A1 | 10/2006 | Guevara et al. | |
| 2008/0157428 | A1 * | 7/2008 | Utagaki et al. | 264/228 |
| 2008/0176967 | A1 * | 7/2008 | Bui | 521/56 |

FOREIGN PATENT DOCUMENTS

JP    8-157278    6/1996

(Continued)

OTHER PUBLICATIONS

PCT Search Report issued on International Application No. PCT/US2008/010544 on May 28, 2009.

(Continued)

*Primary Examiner*—Paul Marcantoni
(74) *Attorney, Agent, or Firm*—Hung H. Bui, Esq.

(57) ABSTRACT

A lightweight structural concrete with screw-ability and nail-ability similar to wood is composed of non-structural and ultra lightweight aggregate such as expanded perlite of a particular size distribution and amount, entrained air cells of another specific size distribution and amount, and dense cementitious composition of a cement binder, a fine grade structural filler no larger than masonry sand grade, a pozzolan, and optional micro-fibers for reinforcement. This structural concrete matrix is optimized to hold 13 gauge T-nails and bugle head wood screws with thread ranging from 8 to 11 threads per inch and diameter of 0.10" to 0.137". The resulting concrete will have consistent screw-ability and nail-ability similar that of wood.

7 Claims, 3 Drawing Sheets

FOREIGN PATENT DOCUMENTS

| | | |
|---|---|---|
| JP | 8-277153 | 10/1996 |
| JP | 9-52779 | 2/1997 |
| JP | 11-343155 | 12/1999 |
| KR | 1998-16799 | 6/1998 |
| KR | 100199041 | 3/1999 |

OTHER PUBLICATIONS

PCT Search Report issued on International Application No. PCT/US2008/010544 on Jun. 18, 2009.

PCT Search Report issued on International Application No. PCT/US2008/010544 on Mar. 25, 2010 (English).

\* cited by examiner

LIGHTWEIGHT STRUCTURAL CONCRETE PROVIDED WITH VARIOUS WOOD PROPERTIES

CROSS-REFERENCE TO RELATED APPLICATIONS

This application claims the benefit of earlier provisional application No. 60/741,487, filed on Dec. 2, 2005, and provisional application No. 60/786,729, filed on Mar. 29, 2006 in the U.S. Patent & Trademark Office, the disclosures of which are incorporated by reference herein.

BACKGROUND OF THE INVENTION

1. Field of the Invention

The present invention relates to lightweight concrete with structural strength and density according to ASTM standard.

2. Description of the Related Art

American Society for Testing and Materials (ASTM) standard defines structural lightweight concrete as having a compression strength in excess of 17.2 MPA (2500 psi) after 28 days curing when tested in accordance with ATSM C 330, and an air dry density not exceeding 1,842 kg/m$^3$ (115 lb/ft$^3$) as determined by ASTM C 567. Standard concrete mix is made of coarse aggregate (stone), fine aggregate (sand), and cement binder. Similarly to standard concrete mix, many current structural lightweight concrete mixtures have the same mix composition, except that the aggregates in the mix are replaced with lower-density ones. Lower-density replacement aggregates can be of man-made aggregates or natural aggregates, and have compression greater than structural strength of 2500 psi. For example, most common man-made (synthetic) lightweight aggregates include expanded shale or clay, cinders, and expanded slag. The most common natural lightweight aggregates include pumice, scoria, tuff, and diatomite.

Currently, the use of structural lightweight concrete has been limited to large cast structures where its lower density is required, such as bridges and high rises. Like most normal concrete material, its utilization in residential buildings has been limited due to its inflexibility and associated cost of the material. Moreover, most structural lightweight concrete, like regular concrete, cannot be screwed and/or nailed, which can be costly and unworkable for most modern residential applications. This is one of the major reasons most residential structures remain wood-based in North America, despite the fact that the performance of structural lightweight concrete is far superior to wood.

Most lightweight concrete (structural or otherwise) falls into three (3) categories. First category of lightweight concrete relates to the standard structural concrete that utilizes lighter aggregates, such as expanded shale or expanded clay as normal stone replacement. The size of lightweight structural aggregates varies from coarse to fine. The mechanics of standard structural concrete matrix work the same way as regular concrete, since the structural aggregates are used to carry the load directly. Second category of lightweight concrete relates to the type of concrete that has no coarse aggregates with structural strength. The concrete is typically provided with fine structural fillers, such as masonry sand and air cells, expanded perlite, vermiculite, or wood particle as non-structural fillers to take up space in the matrix. Fine structural fillers, that are smaller than sand size in some mixes, can be structural as masonry sand, or non-structural, such as micron size expanded perlite or micro air cells. The concrete matrix in the second category (whether it is cellular or perlite concrete) relies solely on the solid cementitious structure (cement binder and fine structural aggregates such as sand) enveloping the air cells or the expanded perlite to do the work. Third category of lightweight concrete relates to the type of concrete that has both structural and non-structural aggregates larger than masonry sand; the concrete matrix will have elements of both the first and second categories.

Hereon, the term "structural aggregate" is defined as aggregate that has compression strength that is greater that 2500 psi as consistent with the term "structural" referred in ASTM standard for concrete. The term "non-structural aggregare" is defined as aggregate with compression strength of 2500 psi or less.

In the second category of lightweight concrete, most are cellular concrete, perlite concrete, vermiculite concrete or the like. These types of lightweight concretes are often provided with non-structural strength and are limited in construction applications. Examples of such cellular concrete are disclosed in U.S. Pat. No. 4,900,359 entitled "Cellular concrete"; U.S. Pat. No. 5,183,505 entitled "Cellular concrete"; and U.S. Pat. No. 6,488,762 entitled "Composition of materials for use in cellular lightweight concrete and methods thereof". Examples of such perlite concrete include U.S. Pat. No. 5,080,022 entitled "Composite material and method", and U.S. Pat. No. 6,881,257 entitled "Machinable light weight sisal-based concrete structural building material". A few of the non-structural lightweight concretes can display some very low level of screw-ability and nail-ability, but nothing close to the properties of wood. As a result, the holding strength of screws and grip strength of nails are very poor in comparison to wood. Normally, these types of lightweight concretes tend to crack when screwed or nailed by a user. A few of structural lightweight concretes such as those disclosed in U.S. Pat. Nos. 5,080,022 and 6,488,762 may have the structural strength; but they lack the screw-ability and nail-ability of wood. Moreover, these types of lightweight concretes are not very economical in a large manufacturing scale, because the mixture requires a large amount of expensive cement binder, or has very limited supply of components as in the case of grounded recycled glass.

Cellular and non-structural aggregate, such as expanded perlite concrete, has been limited only to a few applications that do not require structural strength, but rather take advantage of the insulating characteristics. Past attempts to make this type of concrete into structural grade and make it more economical have resulted in failure. Such past failures are generally attributable to the lack of understanding of the concrete's matrix and its complex mechanism at the microstructure level. Exotic materials required for the concrete mixes or certain new manufacturing processes will always make the concrete more expensive.

Accordingly, there is a need for low cost, high strength lightweight concrete which does not use wood, but possess wood properties so that the lightweight concrete can be easily machined, screwed, and/or nailed without cracking, while maintaining strength characteristics superior to ordinary concrete.

SUMMARY OF THE INVENTION

Several aspects and example embodiments of the present invention provide a unique lightweight concrete that has structural property and screw-ability and nail-ability properties similar to that of wood. In accordance with an example embodiment of the present invention, there is provided a high strength lightweight concrete that can be screwed and nailed using traditional joining tools, comprising: a non-structural lightweight aggregate with average particle size of between 1 mm to 2.5 mm with the narrowest possible size difference between the largest and smallest particles, occupying between 17% to 25% of total concrete volume; entrained air cells with average cell size no larger than 70% of the non-structural filler's average particle size with minimum cell size variance occupying between 3% and 20% of the total concrete volume; and a dense cementitious composition comprising cement binder, pozzolan, and fine structural filler no larger than masonry sand size as defined in ASTM C144 occupying the remainder 55%-80% of total concrete volume.

In accordance with another embodiment of the present invention, there is provided a high strength lightweight concrete mix comprising: (a) 1.05 to 1.75 part volume of Portland cement; (b) 0.75 to 1.25 part volume of fly ash class F, C, or unprocessed fly ash; (c) 1.15 to 1.85 part volume of masonry sand as defined in ASTM C144 or a fine structural filler of size no larger than masonry sand; (d) 1.15 to 1.85 part volume of expanded perlite or similar material with a distribution mean size between 1 mm to 2.5 mm and with at least 75% of the amount of particles falling within +/−0.6 mm from center of the mean size; (e) 0.65 to 1.20 part volume of water or a water to cement (W/C) ratio in the range of 0.4 to 0.67; (f) a predetermined amount of a high-range super-plasticizer to reach a desirable slump, workability, or self-consolidating level; and (g) a predetermined amount of air entrainment admixture to produce 3% to 20% entrained air with a size distribution mean no larger than 70% of size distribution mean of expanded perlite in the concrete.

According to an aspect of the present invention, a short fibrillated PVA fiber or other micro-fiber is further provided to reinforce the concrete so as to prevent crack propagation and to provide structural reinforcement in applications where steel mesh is not used.

According to another aspect of the present invention, the 1.15 to 1.85 part volume of expanded volume is comprised of specific distribution in sizes of expanded perlite: (a) 45%-65% its volume is made up of perlite size 1 to 1.5 mm; and (b) 35%-55% its volume is made up of perlite size 150 um to 850 um in even distribution in the range.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
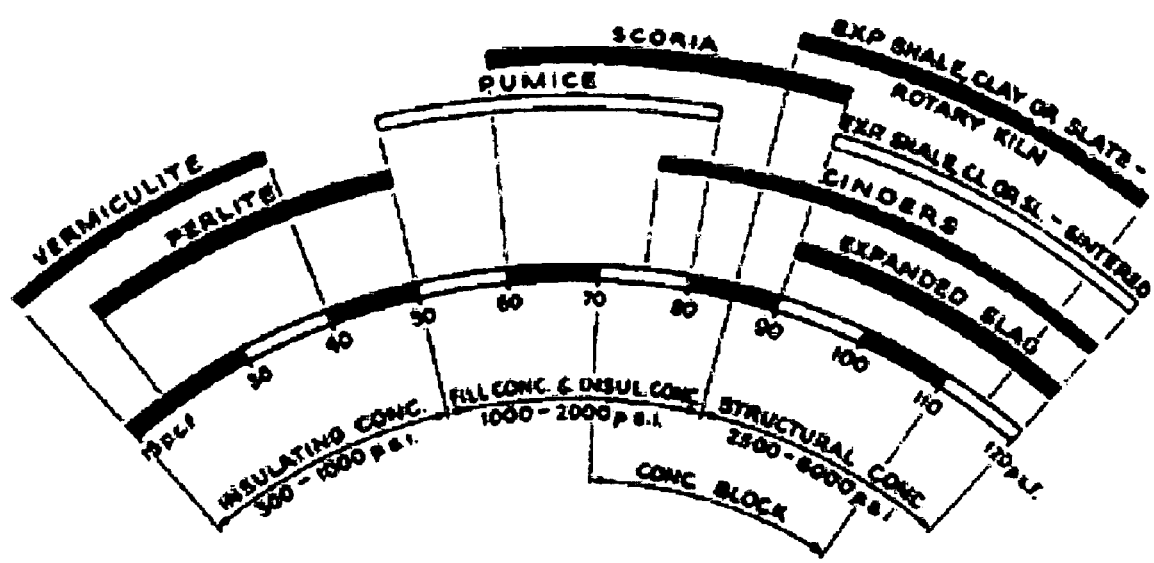
FIG. 1 illustrates currently available lightweight concrete mixes.

The present invention relates to a unique lightweight concrete that has both structural property and screw-ability and nail-ability properties similar to that of wood. For purposes of discussion, the structural property relates to the compression strength of greater than 2500 psi. Lightweight refers to a density that is less than 115 lb/ft$^3$. Various wood properties relate the ability of the lightweight concrete to be easily cut by a saw, screwed by common wood screws and nailed by certain hardened nails without cracking. The combinations of these properties make it unique and valuable in many building construction applications.

Reference will now be made in detail to the present embodiments of the present invention, examples of which are illustrated in the accompanying drawings, wherein like reference numerals refer to like elements throughout. The embodiments are described below in order to explain the present invention by referring to the figures.

FIG. 1 illustrates various available lightweight aggregate concrete mixes ranging from non-structural to structural strength, with the structural mixes containing structural lightweight aggregate, such as expanded shale, expanded slag, cinders, or expanded clay. As previously discussed, conventional structural lightweight concrete mixes, as shown in FIG. 1, do not have screw-ability and nail-ability properties similar to that of wood.

Figure 2:
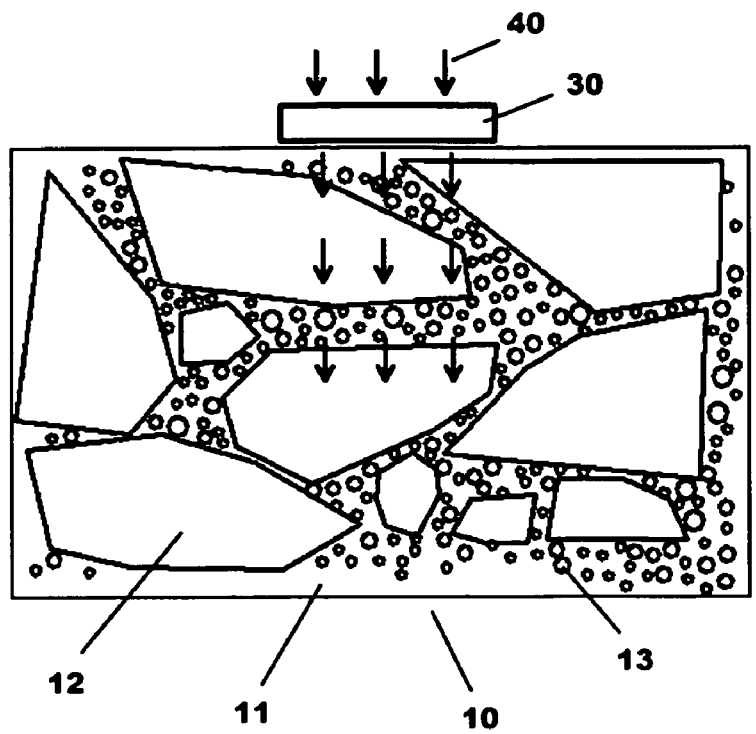
FIG. 2 illustrates the matrix of a standard concrete and its mechanics.

FIG. 2 illustrates a matrix of a standard concrete and its mechanics 10. As show in FIG. 2, the standard concrete has coarse stone aggregates 12, fine sand aggregates 13, and a composition of cement binder and fly-ash 11. The mechanics of this matrix is straight forward. Force vectors 40 from a load starting from above a plate 30 are forced straight downward path through the structural aggregates 12 and through all materials in their path. This is because all components in this matrix have structural strength and capable of holding up the load. The coarse stone aggregates 12 play an important role in providing the concrete strength.

Figure 3:
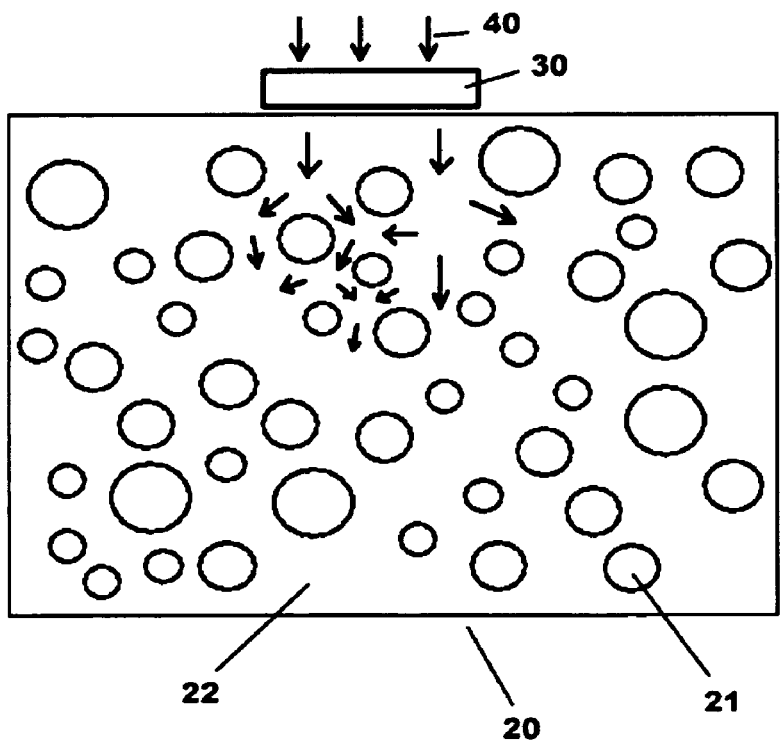
FIG. 3 illustrates the matrix of a cellular concrete and its mechanics.

FIG. 3 illustrates a matrix of a cellular or non-structural filler concrete 20 and its mechanics. As shown in FIG. 3, the cellular or non-structural filler concrete 20 is provided with non-structural fillers or voids 21 and a solid or cementitious structure 22. However, the mechanics of this matrix is more complex. Force vectors 40 from a load are distributed and dispersed in different directions within the cementitious structure 22 and travel around the non-structural fillers or voids 21. The vectors 40 interact with one another to hold up the load. In this matrix, the cementitious structural composition 22 does all the work and is often made of a cement binder, such as Portland cement, pozzolan such as fly-ash, and fine structural filler such as sand. The design of this solid structure 22 enveloping the non-structural fillers or voids is very important in providing compression strength, screw-ability, and nail-ability of an economic concrete of this type. Ideally, fewer forces vectors and their interactions is preferred to make the concrete more likely to have a stable micro-structure.

Figure 4:
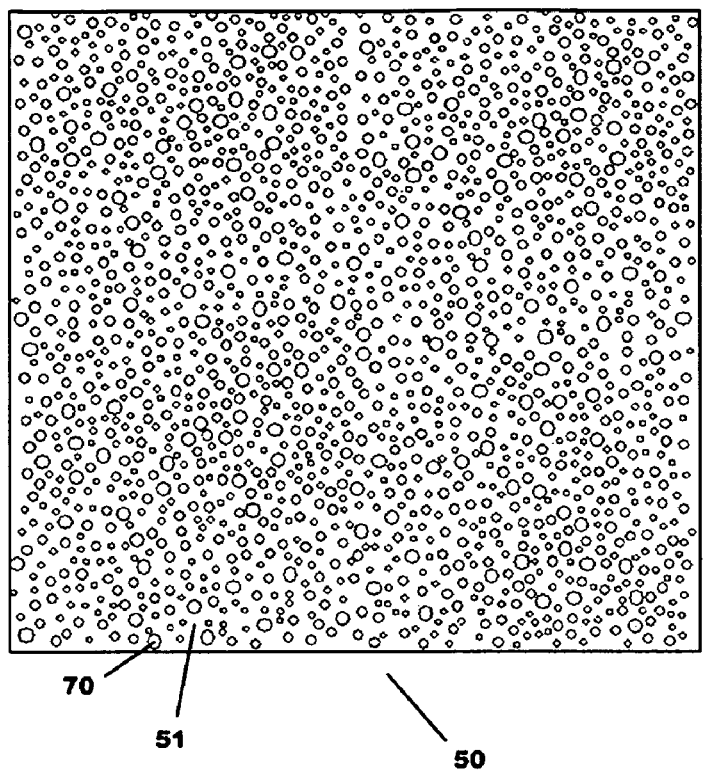
FIG. 4 illustrates the matrix of a typical cellular concrete.

FIG. 4 illustrates a typical cellular concrete matrix 50 with 30% total void volume. As shown in FIG. 4, the cellular concrete 50 is also provided with entrained air cells or voids 70 and a solid or cementitious structure 51. However, the air cells or voids 70 in the concrete 50 are of a single size distribution. The cementitious composition 51 is composed of Portland cement and fly-ash. In this typical cellular matrix, the space between the cells or voids 70 is very narrow.

Figure 5:
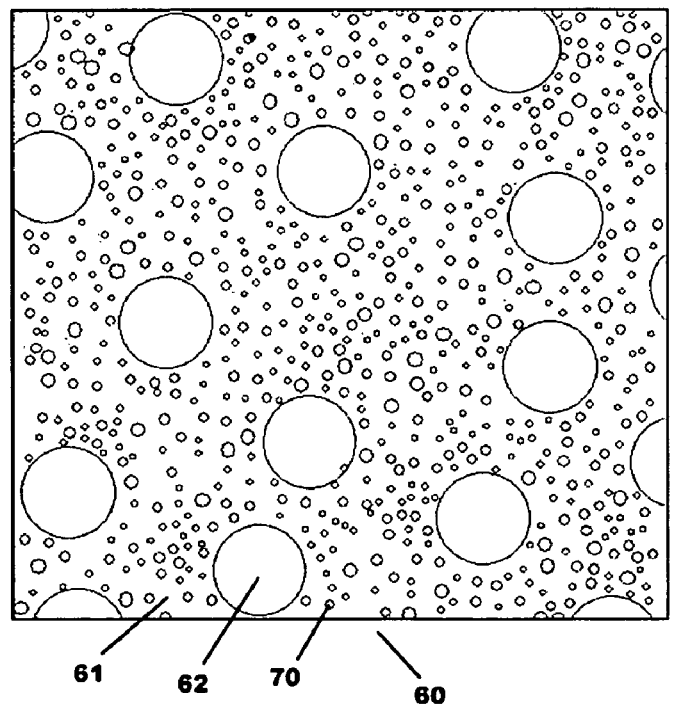
FIG. 5 illustrates an example matrix of a high strength lightweight concrete designed with various wood properties according to an example embodiment of the present invention.

Turning now to FIG. 5, an ideal matrix 60 with the same 30% effective total void volume equivalent to the cellular matrix shown in FIG. 4 according to an example embodiment of the present invention is illustrated. The unique aspect of the matrix according to an embodiment of the present invention is that it has two different effective void size distributions: the larger effective void distribution filled by non-structural filler 62 can be expanded perlite, and the smaller void distribution can be an entrained air cell or void 70. Both the larger effective voids 62 and smaller voids 70 have each own size distribution and amount disperse throughout the matrix 60. The structural and cementitious composition 61 that enveloped both entrained air cells or voids 70 and non-structural fillers 62 is composed of a cement binder, pozzolan, and fine structural filler size no larger than masonry sand. The most important point to notice between this matrix and the typical cellular matrixes of equal density is that Applicant's matrix produce wider cementitious structure between the voids in the concrete matrix 60.

Even though both the cellular matrix 50, as shown in FIG. 4, and Applicant's concrete matrix 60, as shown in FIG. 5, have the same total effective void volume in their matrixes, Applicant has discovered that his matrix 60 with two specific effective void distributions of different size, as shown in FIG. 5, is more stable, screw-able, nail-able, stronger, and cheaper than the cellular matrix 50 with single void distribution of one size, as shown in FIG. 4. The higher stability of the matrix, shown in FIG. 5, is due to the wider and fewer cementitious structures between all voids of large and small. This can be easily understood if one were to look at the force vectors 40 and the area in which the force vectors 40 travel through in the cellular matrix 20 as shown in FIG. 3. The wider the area for the force vectors goes through and few numbers of force vectors in the matrix, the more likely the matrix will be stable because of less interaction between vectors. The wider the area between all effective voids, common fine structural fillers like masonry sand particles can fit in without effecting the integrity of the cementitious structure and cost of concrete can be reduced. As discovered by Applicant, having a certain amount of larger effective void spaces filled by the non-structural aggregate 62 in the matrix 60, as shown in FIG. 5, will cause this widening effect between all the voids if total void volume is kept at a constant. Applicant has also discovered that a certain amount of larger effective voids present in the matrix 60, as shown in FIG. 5, will greatly improved crack propagation when a wood screw or nail penetrates. The larger effective voids around the point of fastener's penetration can act as storage space for the displaced crushed material and reduce the propagating pressure. Through numerous testing, Applicant's concrete performs like wood, for example, if one were to use regular bugle head wood screws with thread range from 8 to 11 threads per inch and diameter of 0.10" to 0.137", and 13G T-nails.

Applicant's ideal concrete matrix, as shown, for example, in FIG. 5, has two non-structural aggregate distributions of two different sizes. The larger aggregate is non-structural filler, such as expanded perlite; the smaller aggregate is the entrained air cells or voids. The purpose of these two size aggregates of two size distributions is to create effective voids of two different sizes distributed evenly throughout the concrete matrix, as shown in FIG. 5, to lighten it, enhance its strength/weight ratio, and make it screw-able and nail-able. Expanded perlite or any non-structural filler with similar properties must have a mean size in the range of 1 to 2.5 mm, with the smallest variance possible. The entrained air cells or voids must have a mean distribution size no larger than 70% of the non-structural filler mean distribution size.

In an ideal scenario, the size distribution of the non-structural aggregate and air cells or voids should have a zero variance. However, in real life production of expanded perlite a variance in size always occurs. As a result, at least 75% of the expanded perlite amount in the concrete should be within the range of +/−0.6 mm from the center of the mean size. If the size variance of the non-structural filler is too large, then concrete matrix will not be consistent or true as defined throughout all sections within the concrete. Similarly, the entrained air cell size distribution must have a mean in the range of microscopic to 0.6 mm with the smallest variance possible. The total effective void volume filled by the amount of non-structural filler, such as expanded perlite in the concrete must be in the range 17% to 25% of total concrete volume. The total void volume of all entrained air cells must be in the range of 3% to 20% of total concrete volume. The solid and supporting structure enveloping both the non-structural aggregates and air cells is composed of any cementitious binder, a pozzolan, and fine structural fillers with grade size no larger than masonry sand size as specified in ASTM C144.

As an example application of Applicant'matrix, as shown in FIG. 5, Applicant has also formulated an ideal mix of this matrix using common components that are both economical and environmental friendly. According to an example embodiment of the present invention, the concrete mixture is composed of:

(1) 1.05 to 1.75 part volume of Portland cement;

(2) 0.75 to 1.25 part volume of fly ash class F, C, or unprocessed fly ash;

(3) 1.15 to 1.85 part volume of masonry sand or other fine aggregates;

(4) 1.25 to 1.70 part volume of expanded perlite with the distribution mean size between 1 mm to 2.5 mm with at least 75% of the amount particles falling within the range of +/−0.6 mm from center of the mean size;

(5) 0.65 to 1.16 part volume of water or maintaining (Water/Cement) weight ratio in the range of 0.45 to 0.6;

(6) Optional short fibrillated PVA fiber or other micro-fiber for reinforcement its matrix as required for crack control and structural reinforcement in applications where steel mesh is not used;

(7) Amount of an air entrainment admixture to produce 3% to 20% entrained air in concrete; and (8) Amount of high-range super-plasticizer admixture to achieve a desired slump.

Samples based on this ideal concrete mix was prepared and successfully tested. The concrete mix used for all samples contains 1.41 part volume of Portland cement Type III, 1.00 part volume of fly ash class C, 1.50 part volume of masonry sand, 1.29 part volume of expanded perlite (density of 6 lbs/cuft, particle range size of 0.75 mm to 2.2 mm with 75% of particles fall in between 1.2 mm and 1.8 mm), 0.91 part volume of water, 0.0135 part volume of Sikament 6100 (a high range super-plasticizer admixture), 0.00342 to 0.00548 part volume of Sika Air (an air entrainment admixture) depending on the desired total air volume in the concrete to achieve certain density.

Strength and density results of the samples are shown in the following Table #1.

TABLE #1

| Density (lb/ft3) | Est. total perlite Vol. | Est. total air Vol. | Total effective void Vol. | Compressive Strength in 28 days (psi) | Compressive Strength in 60 days (psi) |
|---|---|---|---|---|---|
| 87 | 22.0% | 18.0% | 40.0% | 1906 | 2500 |
| 93 | 20.0% | 16.0% | 36.0% | 2366 | 3103 |
| 102 | 20.0% | 9.6% | 29.6% | 3822 | 5013 |
| 117 | 17.0% | 3.0% | 20.0% | 5500 | 7101 |

The samples were tested for screw-ability with #6 bugle head wood screws and for nail-ability with 13G T-nails. In the screw test, screwing into the concrete can be as easy as screwing into wood without a need for pilot hole. No cracks developed in either the screwing or nailing. The holding strength of both screw and nail is actually greater than that of wood. Both screws and nails were tested at 5/8" depth penetration. The maximum holding strength was measured with a pulling device applied to the fasteners. Samples of concrete and a pinewood of 1" thick were tested and compared. The results these pull tests are shown in Table #2.

TABLE #2

| Medium | Maximum Holding Force of 13 G T-nail at 3/4" penetration | Maximum Holding Force of wood screw at 5/8" penetration |
|---|---|---|
| Pine | 254 lbs | 99 lbs |
| Concrete (87 lb/cuft) | 376 lbs | 618 lbs |
| Concrete (93 lb/cuft) | 385 lbs | 625 lbs |
| Concrete (102 lb/cuft) | 408 lbs | 640 lbs |

As previously described, the novel approach in concrete design is not the conventional replacement of normal-density with low-density structural aggregates such as expanded shale or the likes. Rather, the new concrete design relies on Applicant's discovery and understanding of a new type concrete matrix: a matrix that has two different but related non-structural aggregate distributions of two specific sizes. The larger aggregate is non-structural fillers, such as expanded perlite; the smaller aggregate is entrained air cells. The purpose of these two size aggregates with two distinct but related size distributions is to create effective voids of two different sizes distributed evenly throughout the concrete matrix in the concrete matrix, to lighten it, enhance its strength/weight ratio, and make it screw-able and nail-able. The expanded perlite or any non-structural filler with similar properties should have a mean size in the range of 1 to 2.5 mm, with the smallest variance of particle size possible. The entrained air cells should have a mean size no larger 70% of the non-structural filler mean size, with similarly small variance in particle size.

As a result, the present invention advantageously provides a unique lightweight concrete that has structural property and screw-ability and nail-ability properties similar to that of wood. Such a concrete structural building material of the present invention can be made into various shapes and structures for construction purpose, which include, but not limited to, solid block, pre-shaped hollow building block, interior and exterior wall system, precast form for beam, lintel, window sill, column, precast slab, artistic and architectural form, drop ceiling panels, acoustic panels, roofing tiles, boards, frames, and other suitable interior and exterior construction components. Additionally, the material of the present invention can also be used for piping for marine usage, aeronautical usage and automotive usage.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A lightweight concrete having compression strength greater than 2500 psi, the lightweight concrete comprising:
    (a) 1.05 to 1.75 parts by volume of Portland cement;
    (b) 0.75 to 1.25 parts by volume of Class F or Class C fly ash;
    (c) 1.15 to 1.85 parts by volume of masonry sand as defined in ASTM C144 or a fine structural filler of size no larger than masonry sand;
    (d) an amount of expanded perlite effective to achieve between 17% to 25% volume of the concrete, the expanded perlite having a size distribution mean between 1 mm to 2.5 mm and with at least 75% of the amount of particles falling within +/−0.6 mm from the center of the size distribution mean;
    (e) 0.65 to 1.20 parts by volume of water effective to achieve a water to cement (W/C) ratio in the range of 0.4 to 0.67;
    (f) an amount of super-plasticizer effective to produce a target slump; and
    (g) an amount of air entrainment admixture effective to produce 3% to 20% entrained air with a size distribution mean no larger than 70% of the size distribution mean of the expanded perlite in the concrete.

2. The lightweight concrete according to claim 1, further comprising a fibrillated polyvinyl alcohol fiber.

3. The lightweight concrete according to claim 1, wherein said 1.15 to 1.85 parts by volume of expanded volume is comprised of a specific distribution in sizes of the expanded perlite, including:
    (a) 45-65% its volume is made up of a perlite size from 1 mm to 1.5 mm; and
    (b) 35-55% its volume is made up of a perlite size from 150 um to 850 um.

4. The lightweight concrete according to claim 2, wherein said fibrillated polyvinyl alcohol fiber is provided in the amounts of 0.08 to 0.12 parts by volume.

5. A lightweight concrete having a compression strength greater than 2500 psi, the lightweight concrete comprising:
    (a) 1.05 to 1.75 parts by volume of Portland cement;
    (b) 0.75 to 1.25 parts by volume of Class F or Class C fly ash;
    (c) 1.15 to 1.85 parts by volume of masonry sand as defined in ASTM C144 or a fine structural filler of size no larger than masonry sand;
    (d) an amount of expanded perlite effective to achieve between 17% to 25% volume of the concrete, the expanded perlite having a size distribution mean between 1 mm to 2.5 mm and with at least 75% of the amount of particles within a 0.6 mm from a center of the size distribution mean;

(e) 0.65 to 1.20 parts by volume of water effective to achieve a water to cement (W/C) ratio in the range of 0.4 to 0.67;

(f) an amount of super-plasticizer effective to produce a target slump; and (g) an amount of air entrainment admixture effective to produce entrained air with a size distribution mean no larger than 70% of the size distribution mean of the expanded perlite in the concrete.

6. The lightweight concrete according to claim 5, further comprising a fibrillated polyvinyl alcohol fiber.

7. The lightweight concrete according to claim 6, wherein the fibrillated polyvinyl alcohol fiber is provided in the amounts of 0.08 to 0.12 parts by volume.

* * * * *